Patented June 7, 1949

2,472,522

UNITED STATES PATENT OFFICE 2,472,522

LEAK DETECTION

Taber de Forest, Chicago, Ill., assignor, by mesne assignments, to Joseph L. Switzer and Robert C. Switzer No Drawing. Application August 5, 1943, Serial No. 497,541

6 Claims. (Cl. 250—71)

This invention relates to an improvement in the art of detecting leaks. This invention is particularly useful in detecting leaks in closed vacuum systems having a transparent wall, such as radio tubes and the like when such leaks are very minute or in a state of incipiency.

It is the object of this invention to provide a method of detecting leaks or like discontinuities extending through a wall of the body being tested, which method will be more sensitive of minute leaks and leaks in a state of incipiency than the pressure methods of the prior art. It is another object of this invention to provide a method of detecting leaks which is usually more convenient and quicker, and, consequently, less expensive, than the prior art methods. It is also an object of this invention to provide a method of leak detection which, in most instances, requires only a comparatively small quantity of testing liquid. The especial advantage of this invention is that it provides a rapid and certain leak test in most production testing. Other objects and advantages of this invention will appear from the following specification and claims.

For simplicity of explanation and claiming, it will be understood that the term "ultraviolet" will include all suitable fluorescigenous radiations, the term "primary surface" will denote the surface, of a wall being tested, to which testing liquid is applied, and the term "secondary surface" will denote the surface, of the wall being tested, to which a leak extends from the primary surface. With the foregoing terms in mind, the objects and advantages of this invention are obtained by the following generally described method, namely, (1) employing a testing liquid containing a fluorescent agent which causes thin films and capillary areas of the testing liquid to exhibit appreciable fluorescence, said testing liquid exhibiting, to the material of the wall being tested, a wetting action not less than the wetting action of the fluid to be retained by the wall and greater than the wetting action of the fluid, usually air, which is likely to be present in the leaks to be detected; (2) applying the testing liquid to the primary surface and avoiding, because it is usually cumbersome and unnecessary for the purposes of the test, the creation of an increase over normal atmospheric pressure upon the applied testing liquid; and lastly, directing invisible ultraviolet, preferably in the substantial absence of visible light, through the transparent wall of the system and upon the secondary surface. The presence and location of leaks in the wall will be revealed by visible light emitted by the fluorescent testing liquid which has pulled itself through the leaks to the secondary surface. In addition to the foregoing steps, an additional step may be taken to improve or accelerate the testing, namely, employing a fluorescent agent which emits visible light which is differently colored from the light which may be emitted by extraneous fluorescent substances on the secondary surface or by the secondary surface, if the secondary surface itself is fluorescent.

The following are given, by way of illustration, as examples of testing liquids suitable for practice of this method:

Example 1

|     | Per cent |
| --- | --- |
| 1. Ethylene glycol monobutyl ether | 99.5 |
| 2. Ethyl ester of meta monoethylaminophenol phthalein | .5 |

The fluorescent agent (2) is dissolved in the low surface tension vehicle (1). Thin films of the fluorescent testing liquid will emit a bright orange light. The testing liquid will wet most surfaces satisfactorily.

Example 2

|     | Per cent |
| --- | --- |
| 1. Tri-ethylene glycol | 49.8 |
| 2. Octyl alcohol | 50.0 |
| 3. Fluorescein sodium salt | 0.2 |

The fluorescent agent (3) is dissolved in the mixed vehicles (1 and 2). Thin films of the fluorescent testing liquid will emit a bright greenish yellow light. The testing liquid wets most surfaces satisfactorily, especially plastics and vitreous materials. The testing liquid may be readily removed from the wall being tested by washing the wall with water.

Example 3

|     | Per cent |
| --- | --- |
| 1. Kerosene | 94.75 |
| 2. "Fluorol 5GA" | 0.25 |
| 3. Kerosene-soluble naphthenic acid soap | 5.0 |

The fluorescent agent (2) and emulsifying agent (3) are dissolved in the vehicle (1). Thin films of the testing liquid will emit a bright yellowish green light. The testing liquid will wet most surfaces preferentially to air and aqueous liquids. The emulsifying agent permits the testing liquid to be readily removed from the wall being tested by washing the wall with water.

An illustrative but not limitative procedure is as follows:

The extreme accuracy and acuteness of this method is very apparent in testing closed vacuum systems having transparent walls, such as electronic vacuum tubes, for example. Many sealed radio tubes support the highest vacuum obtainable commercially. Some of these tubes are very slow leakers, as indicated by the gradual change in plate current, and may require from two weeks to a month to lose their effective vacuum. Because of the high initial pressure differential across the walls, such leaks are obviously microscopic in order. No method of quickly detecting and locating such leaks was available to the prior art; the prior art method of testing was simply to give the tubes a "shelf test," that is, to store the tubes for two weeks or a month and then test the tubes for their electrical characteristics. This method of rapid leak detection not only avoids the necessity of maintaining a large inventory of manufactured tubes but, by revealing the location of leaks, the percentage of rejected tubes may be reduced by revealing the probable source of leaks due to faulty materials or manufacturing operations.

To detect leaks in electronic vacuum tubes, the tubes are dipped in a testing liquid such as disclosed in the foregoing Examples and then allowed to drain for about fifteen minutes. The tubes are then washed in water to remove the testing liquid from the external surfaces of the tubes, since the presence of such external testing liquid would confuse the subsequent tests. The washed tubes are then inspected under ultraviolet in the absence of visible light. If the tube is a leaker, testing liquid will have penetrated the leaks and will be revealed by fluorescent specks and smears on the internal surface of the tube or, if the leak is along the lead-in wires, by fluorescent streaks along the lead-ins.

The principal reasons for the accuracy and convenience of this method are: First, the testing liquids are "loaded" with fluorescent agents which render thin films and capillary areas of the testing liquids visibly fluorescent under ultraviolet. Only appreciably thicker depths of the so-called "naturally" fluorescent liquids, such as lubricating oils and the like, will exhibit noticeable fluorescence. Second, very minute specks and smears of the testing liquids, even of a microscopic order, are readily visible when viewed under ultra-violet in the substantial absence of visible light due to the extremely high contrast ratio between the visible fluorescing testing liquid and the unilluminated background, as pointed out in the U. S. patent to R. C. Switzer, No. 2,259,400, and in the copending application of Ellis et al., Serial No. 446,820, filed June 12, 1942, now abandoned. Third, this method utilizes, as a force to draw the testing liquid into and through the leaks, the difference, with respect to the material of the wall being tested, between the interfacial surface tension of the testing liquid and the fluid normally present in the leaks, thus rendering it unnecessary to create a super-atmospheric force upon testing liquid on the primary surface of the wall being tested.

In many instances those skilled in the art may find it convenient and expedient to depart from the specific procedures and examples disclosed while remaining within the spirit and scope of this invention as defined in the following claims. This invention, therefore, is not limited to the foregoing embodiments disclosed but by the following claims.

What is claimed is:

1. A method of detecting leaks in a closed vacuum system having walls transparent to visible light and fluorescigenous radiations comprising the steps of applying to the outer primary surface of a wall of the system a luminescent testing liquid which wets the material of the wall being tested, subsequently removing said testing liquid from said primary surface, and then inspecting the inner secondary surface of said wall of the system under fluorescigenous radiations in the substantial absence of visible light for the leaks revealed by visible light transmitted back through a transparent wall of the system by a portion of said testing liquid which penetrated through said wall and luminesces in response to fluorescigenous radiations transmitted through said transparent wall.

2. A method of detecting leaks in a closed vacuum system having walls transparent to visible light and fluorescigenous radiations comprising the steps of applying to the outer primary surface a self-emulsifying testing liquid comprising a vehicle which wets the wall being tested and a fluorescent agent dissolved in said vehicle, subsequently washing said testing liquid from the primary surface, and then inspecting the inner secondary surface of the said wall through a transparent wall of the system under fluoroescigenous radiations for fluorescing testing the liquid which penetrated the leaks in the wall of the system and which is revealed by visible light emitted by said testing liquid in response to fluorescigenous radiations transmitted through a transparent wall of the system.

3. The method of testing an electronic vacuum tube having a transparent wall for leaks in the walls of the tube comprising the steps of applying to the external surface of the tube to be inspected for leaks a luminescent testing liquid which wets the material of the wall to be tested, subsequently removing the testing liquid from said exterior surface, and then inspecting the inside of the tube with ultra-violet for fluorescent indications, apparent through the transparent wall, of testing liquid which penetrated through the leaks which may be present in the wall to which the testing liquid was applied.

4. The method of testing transparent walled radio tubes for leaks comprising the steps of dipping the tube in a fluorescent testing liquid which wets the walls of the tube, removing said liquid from the external transparent walls of the tube, and subjecting the tube to ultraviolet to cause testing liquid which has penetrated through leaks to the inside of the tube to fluoresce and thereby reveal the presence and location of such leaks.

5. The method as defined in claim 4 in which the step of removing the testing liquid from the external transparent walls of the tube comprises the step of washing the tube with water.

6. The method as defined in claim 5 in which the testing liquid comprises a vehicle and a fluorescent agent and an emulsifying agent dissolved in the vehicle whereby the step of washing the tube causes the emulsifying agent to remove the vehicle and dissolved fluorescent agent by emulsification in the water.

TABER DE FOREST.

REFERENCES CITED

The following references are of record in the file of this patent:

UNITED STATES PATENTS

| Number | Name | Date |
|---|---|---|
| 2,096,099 | Gaugler | Oct. 19, 1937 |
| 2,259,400 | Switzer | Oct. 14, 1941 |
| 2,267,999 | Switzer | Dec. 30, 1941 |
| 2,320,842 | Arnold | June 1, 1943 |